United States Patent
Volk

(10) Patent No.: US 8,408,576 B2
(45) Date of Patent: Apr. 2, 2013

(54) OFF-ROAD HITCH ASSEMBLY

(76) Inventor: Don Volk, Prineville, OR (US)

(*) Notice: Subject to any disclaimer, the term of this patent is extended or adjusted under 35 U.S.C. 154(b) by 0 days.

(21) Appl. No.: 13/561,389

(22) Filed: Jul. 30, 2012

(65) Prior Publication Data
US 2013/0056957 A1  Mar. 7, 2013

Related U.S. Application Data

(60) Provisional application No. 61/530,726, filed on Sep. 2, 2011.

(51) Int. Cl.
*B60D 1/155* (2006.01)
(52) U.S. Cl. ............. 280/293; 280/482; 280/491.2; 280/492
(58) Field of Classification Search ............ 280/492, 280/493, 494, 479.2, 491.2, 482; 248/127, 248/168, 231.61, 292.12, 298.1, 424, 429, 248/455, 688
See application file for complete search history.

(56) References Cited

U.S. PATENT DOCUMENTS

| | | | | |
|---|---|---|---|---|
| 1,257,454 A | * | 2/1918 | Brady | 280/444 |
| 1,764,971 A | * | 6/1930 | Nilson | 280/402 |
| 2,189,667 A | * | 2/1940 | Kries | 280/493 |
| 2,320,046 A | * | 5/1943 | Notar | 280/489 |
| 2,440,877 A | * | 5/1948 | Russell | 280/505 |
| 2,497,234 A | * | 2/1950 | Mylie | 280/482 |
| 2,635,891 A | * | 4/1953 | Cook | 280/495 |
| 2,743,118 A | * | 4/1956 | Dotson | 280/478.1 |
| 4,548,423 A | | 10/1985 | Craven | |
| 4,828,282 A | * | 5/1989 | Pinto | 280/32.7 |
| 6,234,495 B1 | * | 5/2001 | Velke | 280/32.7 |
| 6,378,904 B1 | | 4/2002 | Niehoff | |
| D469,388 S | | 1/2003 | Mighell | |
| 6,637,760 B1 | * | 10/2003 | Carman | 280/32.7 |
| 7,229,090 B2 | | 6/2007 | Cumbie | |
| D601,059 S | | 9/2009 | Greer | |
| 7,938,431 B1 | | 5/2011 | Snyder | |
| 2006/0097482 A1 | | 5/2006 | Cumbie | |
| 2008/0012266 A1 | | 1/2008 | Lee | |

* cited by examiner

*Primary Examiner* — Paul N Dickson
*Assistant Examiner* — Daniel Yeagley
(74) *Attorney, Agent, or Firm* — Daniel Boudwin

(57) ABSTRACT

Disclosed is an improved all terrain vehicle (ATV) trailer hitch system, comprising a first and second pivotal joint connected by an elongated driveshaft for navigating uneven terrain and maneuvering through tight turns without joint binding or trailer tipping. The driveshaft comprises a length adjustable member having a first end connecting to a lead vehicle via a first pivotal joint that statically supports the joint and allows pitching of the driveshaft. The driveshaft second end attaches by way of a second pivotal and rotatable joint to a trailer attachment assembly. The trailer attachment assembly provides connection to the trailer and for receiving an elongated drive screw member that establishes a rotational joint. The second pivotal joint therefore provides yaw and roll capability for the trailer. The system provides a multiple joint connection separated by an elongated driveshaft between a vehicle and a trailer for reduced binding and off-road maneuvering.

5 Claims, 4 Drawing Sheets

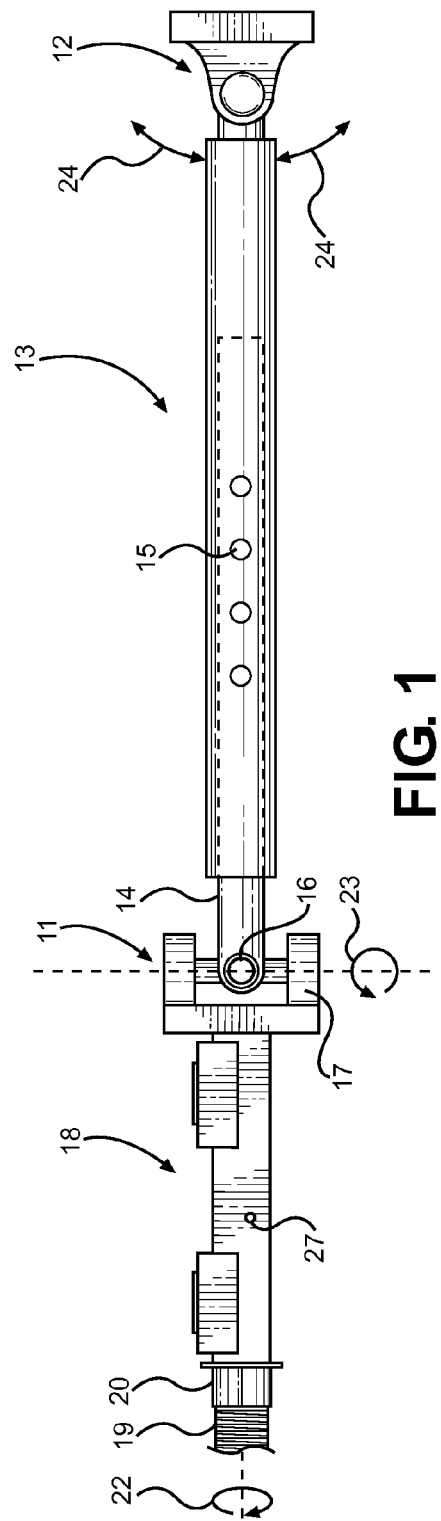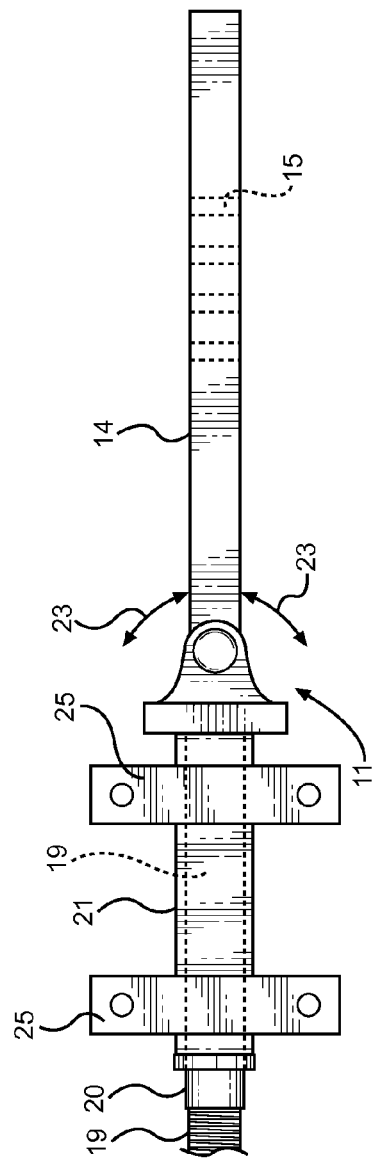
FIG. 1
FIG. 2

OFF-ROAD HITCH ASSEMBLY

CROSS REFERENCE TO RELATED APPLICATION

This application claims the benefit of U.S. Provisional Application No. 61/530,726 filed on Sep. 2, 2011, entitled "ATV's Trailer and Hitch System." The patent application identified above is incorporated here by reference in its entirety to provide continuity of disclosure.

BACKGROUND OF THE INVENTION

1. Field of the Invention

The present invention relates to trailer hitches for all terrain vehicles and off-road vehicles. More specifically, the present invention pertains to an adjustable trailer hitch having a pair of universal joints that allow improved handling of a trailer behind an off-road vehicle while navigating uneven terrain or during tight turn maneuvers.

Trailer hitches are mechanical assemblies that permit the connection of a trailer to a vehicle using a specific type of coupling. Most car and truck receiver hitches involve a ball joint that connects a trailer shaft to a ball joint extending from a receiver assembly that is attached to the vehicle frame. This connection allows relative rotation between the trailer and the lead vehicle about the ball joint location, which commonly occurs over changing road surfaces and any relative movement between the trailer and vehicle suspensions. Motorcycle and all terrain vehicle (ATV) trailer attachment systems commonly involve greater pivotal capability, wherein motorcycle hitches in particular must allow the motorcycle to lean during turns and maneuvers, wherein the motorcycle leans independently of the trailer to ensure stability during turns. Both of these hitch types involve a single universal joint that allows rotation and pivoting of the joint about a single joint location.

Problems arise when deploying such joints on an ATV and off-road vehicle, as these vehicle types are not restricted to smooth roadway surfaces. Traversing off-road terrain or navigating through undeveloped land can expose the trailer and lead vehicle to relative pitching and rotation, which places considerable load on the hitch if sufficient freedom of movement and rotation is not provided. A further issue associated with ATV trailer hitches is the ability to navigate within tight spaces, for instance between trees and rocks during an off-road venture. The ability to make tight turns without binding or maxing out the free rotation/pivoting of the hitch joint is of prime importance for vehicle stability, off-road capability and further the integrity of the components. If a turn is taken too sharply while traveling over an uneven surface, the trailer hitch will be subjected to considerable load that can cause failure of the joint, or even cause the trailer itself to tip on its side. This situation creates a hazard for the user, as damage to the trailer hitch may be without remedy in desolate areas, and tipping of the trailer puts both the trailer and the lead vehicle in danger of rolling over. If one side of the trail lifts off of the ground, spilling or tumbling supplies can result, as well as expose the assembly and the vehicles to damage.

The present invention provides a new and improved ATV hitch that utilizes an adjustable driveshaft length to offset the trailer from a lead vehicle, while also providing increased freedom of movement with respect to the trailer and lead vehicle by incorporating a first and second pivotal joint at the ends of the driveshaft. This increased freedom and offset provides a means to traverse extreme off-road surface irregularities and navigate between confined areas that require a tight turning radius. Each universal joint utilizes a first and second yoke, where the outer yoke is fixed to either the lead vehicle or the trailer, and the inner yoke is permitted to rotate thereabout. The trailer yoke is further rotatably connected to the trailer frame to allow the system to permit yawing, pitching and rolling of the trailer with respect to the lead vehicle without binding. Overall, the system provides improved handling and mobility when attaching a trailer to an off-road vehicle such as an all terrain vehicle.

2. Description of the Prior Art

Devices have been disclosed in the prior art that relate to trailer hitches and ATV hitch assemblies. These include devices that have been patented and published in patent application publications, and generally relate to trailer hitches for ATVs with limited articulation capability or a single universal joint connection. The forgoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 6,378,904 to Niehoff discloses a trailer that is adapted to be hitched to an all terrain vehicle to haul cargo. The trailer includes a tubular frame and tongue attachable to a ball hitch mounted to the lead vehicle. This provides a direct connection with the trailer hitch of the lead vehicle and a standard ball hitch attachment, which provides adequate relative motion for even terrain, however lacks the ability to heavily articulate around tight turns or react to extremely uneven terrain without causing dislodgment or damage to the hitch assembly.

Similar to the Niehoff device is U.S. Pat. No. 7,229,090 to Cumbie, which discloses a folding trailer for attachment to an all terrain vehicle trailer hitch. The tongue of the hitch attachment is enable to pivot the trailer from a horizontal to a vertical position, as desired by the user. The connection to the trailer hitch of the ATV is one that includes an elongated and tubular connection that does not permit relative rotation when deployed. The lack of rotational freedom limits the terrain upon which the assembly may deployed without overly loading the hitch assembly, particularly when considering very uneven terrain or tight quarters mobility between obstacles.

U.S. Pat. No. 7,938,431 to Snyder is another such device that discloses a swivel type hitch for an all terrain vehicle, wherein a universal joint is positioned between the vehicle and the trailer for improved freedom of movement. The device comprises universal joint, a spindle attached to the universal joint, a slideable sleeve placed onto the spindle, while the sleeve is attached to the tongue of the trailer. A plurality of plates attach to the sleeve to limit rotation of the trailer and reinforce the structure while in use. While the Snyder device discloses a trailer hitch for an ATV using a universal joint for improved relative rotation, the use of a single joint limits the turning radius of the hitch and further the allowable motion of the trailer with respect to the vehicle while on severely uneven terrain. The present invention utilizes a pair of pivotal and rotatable joints connected by a slideable driveshaft connection, providing a setup having an offset between pivot and rotation points that separate movement between the vehicle and the trailer. This prevents binding at extreme angles during maneuvering or traversing uneven terrain.

Finally, U.S. Pat. No. 4,548,423 to Craven discloses a similar trailer hitch setup as the Snyder device, wherein a universal joint is positioned between a split block and a bearing block for connecting a trailer to a vehicle and providing horizontal and vertical pivotal movement and longitudinal rotation thereof. The split block provides an openable block that sandwiches a pin of one yoke of the universal joint for quick connection and disengagement between the two, while a pin from a second yoke connects through a bearing block and is secured by a pair of locking nuts to prevent dislodgment. Similar to the Snyder device, the range of rotation at severe angles is limited with a universal joint, while a multiple, separated joint setup provides improved clearance for turning, a means to prevent binding at extreme vehicle turn angles, and further extreme rotational angles over uneven terrain, all while the trailer and vehicle maintain contact with the ground during the maneuver.

The present invention provides an articulating trailer hitch attachment that is particularly suited for use with ATVs and off-road vehicles. The design of the assembly is one that allows articulation of the trailer in the way of pitching, rolling and yawing with respect to the lead vehicle during deployment. The ends of the assembly are securely fastened to the lead vehicle and trailer, while a first pivotal joint and second pivotal rotation joint are provided to allow movement of the trailer over obstacles and through tight spaces when traveling off-road. It is submitted that the present invention is substantially divergent in design elements from the prior art, and consequently it is clear that there is a need in the art for an improvement to existing off-road trailer attachment systems. In this regard the instant invention substantially fulfills these needs.

SUMMARY OF THE INVENTION

In view of the foregoing disadvantages inherent in the known types of trailer attachment assemblies now present in the prior art, the present invention provides a new off-road trailer attachment system, wherein the same can be utilized for providing convenience for the user when maneuvering over uneven terrain and between obstacles that require extreme turn angles.

It is therefore an object of the present invention to provide a new and improved off-road trailer attachment system that has all of the advantages of the prior art and none of the disadvantages.

It is another object of the present invention to provide an off-road trailer attachment system that allows a lead vehicle to be connected to a trailer, whereby the connection prevents binding over off-road terrain and during tight turning maneuvers.

Another object of the present invention is to provide an off-road trailer attachment system that allows a trailer to yaw, pitch and roll without binding the hitch assembly or tipping the trailer.

Yet another object of the present invention is to provide an off-road trailer attachment system that includes a statically connected first pivot joint in connection with the lead vehicle that permits pitching of the trailer, and a second pivot joint that is rotatably connected to the trailer to allow rolling and yawing of the trailer.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a side view of the present invention, including the rear trailer attachment assembly.

FIG. 2 shows an overhead view of the rear trailer attachment assembly and rear pivot joint rotatably connected thereto.

DETAILED DESCRIPTION OF THE INVENTION

Figure 3:
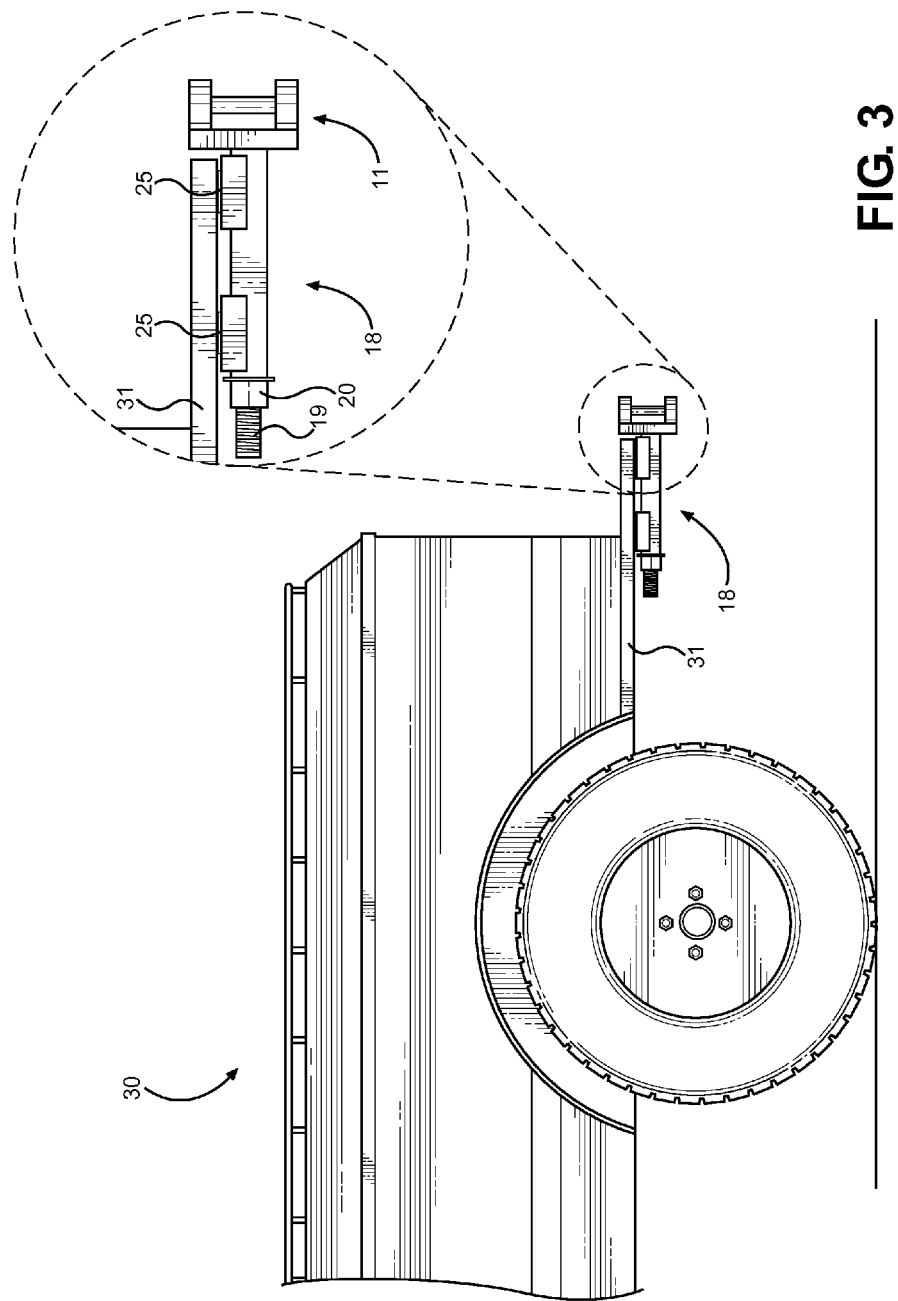
FIG. 3 shows a side view of the rear trailer attachment assembly attached to the frame of an off-road trailer.

Reference is made herein to the attached drawings. Like reference numerals are used throughout the drawings to depict like or similar elements of the off-road trailer attachment system. For the purposes of presenting a brief and clear description of the present invention, the preferred embodiment will be discussed as used for preventing binding or tipping of a trailer when towed by an off-road vehicle. The figures are intended for representative purposes only and should not be considered to be limiting in any respect.

Referring now to FIG. 1, there is shown a side view of the off-road trailer attachment system of the present invention. The system comprises an offset series of pivot points between connections to a lead vehicle and a rearward trailer vehicle to provide clearance therebetween, improved articulating of the hitch system for improved off-road handling and further a means to prevent binding during tight maneuvering. The elements of the system first include a first pivot joint 12 adapted to be statically supported by the lead vehicle, preferably by a trailer hitch attachment assembly that prevents movement or rotation of the connection thereto. The first pivot joint 12 connects to an elongated and adjustable-length driveshaft 13 that extends away from the lead vehicle and connects to a second, rearward pivot joint 11. The second pivot joint 11 is connected to a trailer attachment assembly 18 by way of a rotational cylindrical joint that allows free rotation of the second pivot joint 11. Overall, the first pivot joint 12 allows pitching 24 upwards and downwards of the driveshaft 13 from its joint location, while the second pivot joint allows yawing 23 of the trailer attachment assembly 18 and the rotational joint allows rolling 22 of the trailer attachment assembly 18. This connection permits a rearward trailer to pitch, yaw and roll relative to a lead vehicle while being offset therefrom, which accommodates relative movement along off-road surface and tight turning situations that would otherwise cause a single-pivot joint hitch to bind.

The first pivot joint 12 includes a statically secured first yoke that attaches to the lead vehicle, while its second yoke connects to the driveshaft 13 and is free to pivot the driveshaft 13 up and down 24. The second, rearward pivot joint 11 employs a rotatable first yoke 17 that attaches to a second yoke 16 connecting to the driveshaft 13 member, whereby this joint provided left-to-right yaw rotation 23 and a rolling rotation 22 for the rear trailer attachment 18. The driveshaft 13 comprises an elongated member having a translational joint that is securable in a number of discrete pin locations 15 to lengthen or shorten the gap between pivot joints 11, 12. The translational joint comprises an inner shaft 14 that slides within interior of an outer shaft, whereby the two are able to slide relative to one another for length adjustment and a locking pin secures the two together for a static length.

Referring now to both FIGS. 1 and 2, the rearward trailer attachment assembly 18 is shown in a side view and overhead view for clarity. The attachment assembly 18 attaches to a cylindrical joint that allows the rearward pivot joint 11 to freely rotate 22 about a longitudinal axis defined along the length of the trailer vehicle. The cylindrical joint comprises an elongated inner cylinder 19 having a threaded end for engagement of a securement nut 20, while the cylinder 19 rotates within a sleeve 21 that supports the cylinder 19 without interference. A grease fitting 27 is preferably positioned along the sleeve such that the cylindrical joint may be lubricated over an extended usage period, reducing friction and free rotation of the inner cylinder 19. Above the sleeve 21 and attaching thereto is a trailer frame attachment means, preferably comprising a plurality of flanges 25 having fastener locations along their length for accepting a fastener adapted to connect the assembly 18 to the trailer frame undercarriage. It is desired that this attachment assembly 18 be a universal system that can attach to a number of different trailer frames, or alternately is one that is designed specifically for each application.

Referring now to FIG. 3, there is shown a side view of the rearward trailer attachment assembly 18 in connection with a trailer frame 31 undercarriage. As shown, the assembly 18 attaches utilizing at least one attachment flange 25 and a plurality of fasteners 26 that connect the assembly to the frame 31. Once secured, the cylindrical joint and rear pivot 11 allow rolling and yawing of the trailer with respect to the lead vehicle during movement. This allows wheels on both sides of the trailer to remain in connection with the ground surface, even during tight maneuvers or when traversing extreme terrain that causes excessive rolling of the trailer chassis.

Figure 4:
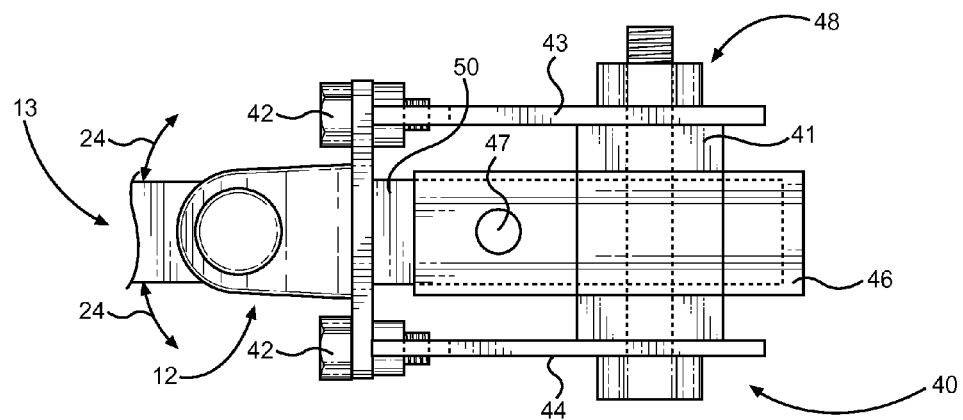
FIG. 4 shows a side view of an embodiment of the static connection of the first pivot joint to the lead vehicle.

Referring now to FIG. 4, there is shown a side view of the forward portion of the present off-road vehicle attachment means. In this view, the attachment of the system to the lead vehicle is shown as an example embodiment of the requirements for functionality of the overall coupling between the trailer and vehicle. It is submitted that a simple connection to a trailer hitch receiver 46 using an extended member 50 is insufficient for securing the first pivot joint 12 in a static position as the drive shaft assembly 13 and the trailer articulate through their ranges of motion. The loads and torque on the pivot 12 attachment point cause the loosened receiver fitting 47 to shift in its position and eventually wear the overall joint, while also poorly constraining the pivot 12 for proper driveshaft pivoting 24 along a single plane. Therefore, a reinforced or designed structure is disclosed that fulfills the need for properly constraining the forward pivot 12. Specifically, a torque box structure 40 is provided, comprising an upper 43 and lower 44 horizontal plate connected by a pair of vertical members 41 and the backplate of the pivot joint 12 to form a box structure that resists deforming under torque loads and stiffens the constraint for the forward pivot joint 12.

Figure 5:
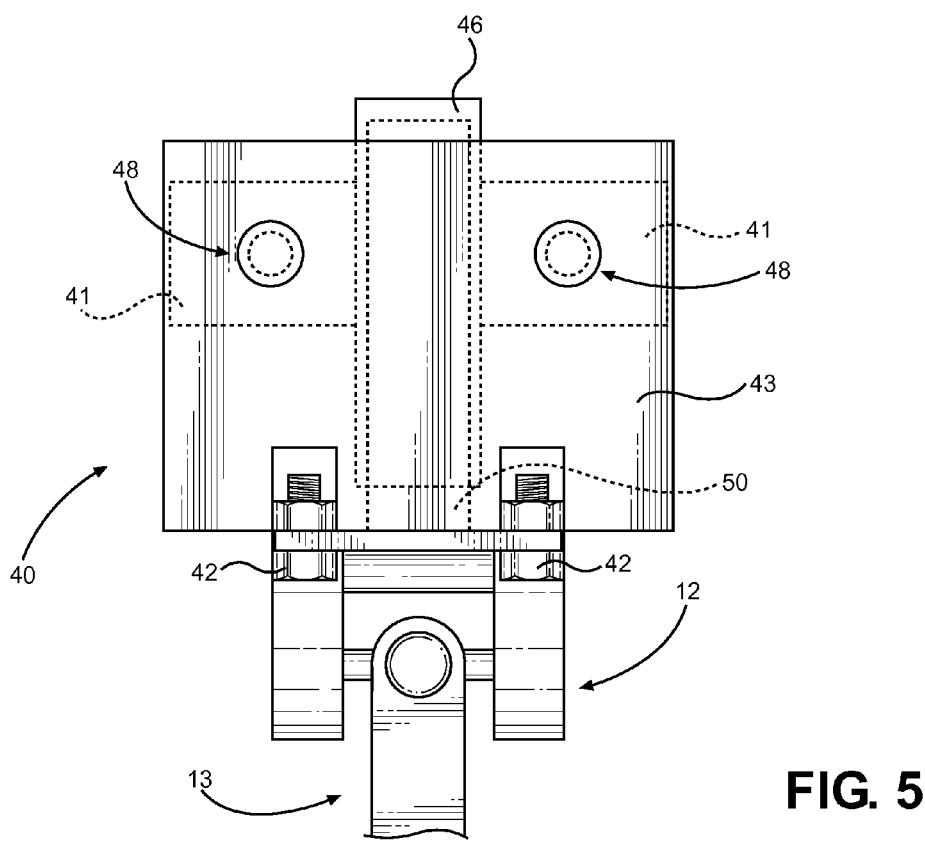
FIG. 5 shows an overhead view of the embodiment of the static connection of the first pivot joint to the lead vehicle.

Referring to both FIG. 4 and FIG. 5, wherein FIG. 5 shows an overhead view of the lead vehicle attachment means, it is shown that the forward pivot joint 12 attaches using a plurality of bolts 42 that fasten through receiving nut hardware attached to the upper and lower plates 43, 44. The plates 43, 44 are then secured to one another by a pair of upstanding posts 41 that may further connect to the trailer hitch receiver 46 via threaded fasteners 48 to secure the entire assembly in a static position and accept loads from the pivot joint 12.

Figure 6:
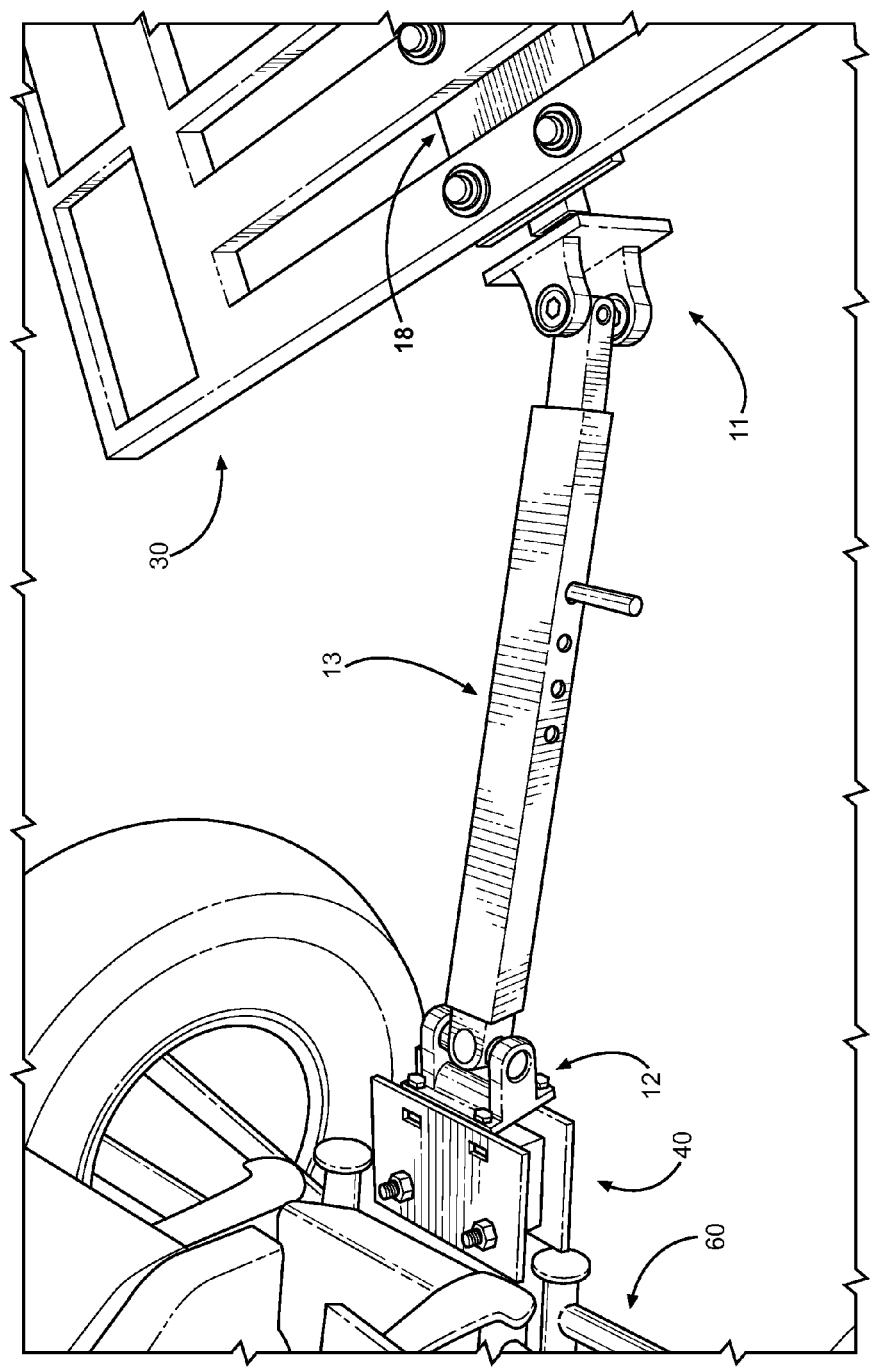
FIG. 6 shows an overhead perspective view of the present invention in a working state connecting a lead vehicle to a trailer.

Referring now to FIG. 6, there is shown an overhead perspective view of the present invention in a working state, connecting a lead vehicle 60 to a rearward trailer 30. The elongated driveshaft 13 is one that places an offset between the trailer 30 and the lead vehicle 60, while the forward pivot joint 12, rearward pivot joint 11 and the rotational joint allow the trailer 30 to move relative to the vehicle 50 while deployed. The ability to roll, pitch and yaw relative to the forward vehicle 60 allows the trailer 30 to overcome obstacles that would otherwise cause binding and complete impasses for traditional trailer hitch assemblies. It is desired to disclose a connection for the forward pivot joint to the vehicle 60 that supports the pivot joint 12 in a static configuration, allowing pitching of the driveshaft 13 without deforming under load. Similarly, it is desired that that rear trailer assembly connects to a trailer sufficiently to support the rotational joint and the rear pivot joint 11 during operation. It is not desired to limit these assemblies to a specific design, but rather to disclose an example embodiment that has been shown effective for the requirements of the system. The pivot joints themselves are preferably single axis bushings or cylindrical joints, wherein the forward joint 12 allows pitching of the trailer and the rear joint 11 allows yawing thereof. However, another embodiment of the present invention contemplates the use of ball joints at these locations, freeing up more degrees of freedom to further prevent binding or load introduction into the assembly or the vehicle and trailer frames.

The present invention provides a new and unique attachment between a trailer and lead vehicle that is particularly suited for off-road use and use with all terrain vehicles. The ability to navigate over severely uneven terrain and turn through tight passageways provides an improvement in the art of trailer attachments that allows the trailer hitch of the present invention to be more versatile and reliable for a user while off-road traveling. The risk posed by traditional trailer hitches includes damage to the attached vehicles due to binding and load introduction, to the hitch itself or to the user when the vehicle becomes stuck at an impasse that the two vehicles are unable to traverse.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A trailer attachment system, comprising:
an elongated driveshaft having a first and second end, wherein said driveshaft has a length adjustable translational joint and locking means for lengthening or shortening said driveshaft length;
said driveshaft first end connecting to a forward pivot joint having a backplate that is further adapted to connect to a lead vehicle tow hitch receiver or vehicle frame;
an upper and lower horizontal plate secured together via a pair of upstanding posts;

a vehicle tow hitch receiver is vertically positioned between said upper and lower horizontal plates and horizontally positioned between said upstanding posts;

an elongated member extending from a surface of said forward pivot backplate distal from said driveshaft, wherein said elongated member fits within and engages with said vehicle tow hitch receiver;

a pair of fasteners securing said forward pivot joint backplate to said upper and lower plates such that said horizontal plates are perpendicular to said forward pivot joint backplate;

said driveshaft second end connecting to a rear pivot joint that further connects to a trailer attachment assembly;

said trailer attachment assembly comprising an elongated inner cylinder extending from said rear pivot joint and concentric with an outer sleeve, said sleeve housing said inner cylinder to form a freely rotating cylindrical rotation joint, a plurality of trailer assembly flanges disposed on said sleeve, and a plurality of flange fasteners for securing said trailer assembly flanges to a trailer frame;

said forward and rear pivot joint and said rotational joint allowing a trailer to pitch, roll and yaw with respect to a connected lead vehicle when attached.

2. The device of claim 1, wherein said forward pivot joint allows upward and downward rotation of said driveshaft for relative pitching of said trailer with respect to said leading vehicle.

3. The device of claim 1, wherein said rear pivot joint allows side to side rotation of said driveshaft for relative yawing of said trailer with respect to said leading vehicle.

4. The device of claim 1, wherein said attachment assembly rotational joint allows rotation about a longitudinal axis of said trailer for relative rolling of said trailer with respect to said leading vehicle.

5. The device of claim 1, wherein said forward and rear pivot joints further comprise cylindrical, single axis rotation bushings.

* * * * *